United States Patent
Labio et al.

(10) Patent No.: US 7,454,480 B2
(45) Date of Patent: Nov. 18, 2008

(54) SYSTEM AND METHOD FOR OPTIMIZING ACCESS TO INFORMATION IN PEER-TO-PEER COMPUTER NETWORKS

(75) Inventors: Wilburt Juan Labio, Sunnyvale, CA (US); Giao Thanh Nguyen, San Jose, CA (US); Winston Wencheng Liu, Moreno Valley, CA (US); Gurmeet Singh Manku, Stanford, CA (US)

(73) Assignee: Napster, Inc., Los Angeles, CA (US)

( * ) Notice: Subject to any disclaimer, the term of this patent is extended or adjusted under 35 U.S.C. 154(b) by 0 days.

(21) Appl. No.: 11/444,648

(22) Filed: May 31, 2006

(65) Prior Publication Data

US 2006/0218274 A1    Sep. 28, 2006

Related U.S. Application Data

(62) Division of application No. 09/635,777, filed on Aug. 11, 2000, now Pat. No. 7,089,301.

(51) Int. Cl.
*G06F 15/16* (2006.01)

(52) U.S. Cl. .................. 709/217; 709/201; 709/203; 709/216; 709/224; 709/225; 709/241; 718/106; 707/2; 707/3; 707/10

(58) Field of Classification Search .......... 709/201, 709/203, 216–219, 224–225, 238, 241, 105, 709/229, 239; 718/105; 707/10, 201, 2, 707/3

See application file for complete search history.

(56) References Cited

U.S. PATENT DOCUMENTS

| | | | | |
|---|---|---|---|---|
| 5,819,033 A * | 10/1998 | Caccavale | ............ | 709/224 |
| 6,055,568 A * | 4/2000 | Adams | ............ | 709/221 |
| 6,065,046 A * | 5/2000 | Feinberg et al. | ............ | 709/216 |
| 6,185,619 B1 * | 2/2001 | Joffe et al. | ............ | 709/229 |
| 6,324,582 B1 * | 11/2001 | Sridhar et al. | ............ | 709/230 |
| 6,327,622 B1 * | 12/2001 | Jindal et al. | ............ | 709/228 |
| 6,339,785 B1 * | 1/2002 | Feigenbaum | ............ | 709/213 |
| 6,542,964 B1 * | 4/2003 | Scharber | ............ | 711/122 |
| 6,850,980 B1 * | 2/2005 | Gourlay | ............ | 709/226 |
| 6,963,914 B1 * | 11/2005 | Breitbart et al. | ............ | 709/226 |
| 2002/0049760 A1 * | 4/2002 | Scott et al. | ............ | 707/10 |
| 2002/0188838 A1 * | 12/2002 | Welder | ............ | 713/2 |
| 2006/0149806 A1 * | 7/2006 | Scott et al. | ............ | 709/201 |

* cited by examiner

*Primary Examiner*—Oanh Duong
(74) *Attorney, Agent, or Firm*—Martine Penilla & Gencarella, LLP

(57) ABSTRACT

A method and system for intelligently directing a search of a peer-to-peer network, in which a user performing a search is assisted in choosing a host which is likely to return fast, favorable results to the user. A host monitor monitors the peer-to-peer network and collects data on various characteristics of the hosts which make up the network. Thereafter, a host selector ranks the hosts using the data, and passes this information to the user. The user then selects one or more of the highly-ranked hosts as an entry point into the network. Additionally, a cache may collect a list of hosts based on the content on the hosts. In this way, a user may choose to connect to a host which is known to contain information relevant to the user's search. The host selector may be used to select from among the hosts listed in the cache.

17 Claims, 4 Drawing Sheets

2

SYSTEM AND METHOD FOR OPTIMIZING ACCESS TO INFORMATION IN PEER-TO-PEER COMPUTER NETWORKS

CLAIM OF PRIORITY

The present application is a divisional of Ser. No. 09/635,777, now U.S. Pat. No. 7,089,301, entitled "System And Method For Searching Peer-To-Peer Computer Networks By Selecting A Computer Based On At Least A Number Of Files Shared By The Computer," filed on Aug. 11, 2000 and incorporated herein by reference.

CROSS REFERENCE TO RELATED APPLICATIONS

The present application is related to U.S. application Ser. No. 11/445,808, entitled "System And Method For Searching Peer-To-Peer Computer Networks," filed on May 31, 2006, and incorporated herein by reference.

BACKGROUND OF THE INVENTION

1. Field of the Invention

The present invention relates generally to the searching of data contained within a computer network and, more particularly, to a system and method for searching peer-to-peer computer networks by determining optimal hosts for searching.

2. Discussion of the Related Art

The computer network now known as the Internet began by individuals forming "links" between their respective computers. Over time, for a variety of reasons, users began to access more and more information through a centralized location or locations. Users' information was uploaded to servers, which were in turn accessed and searched by other users. Today, users typically access the Internet only through their (local) service provider, and companies such as Excite™ and Yahoo!™ provide users with search engines, or information portals, which attempt to provide users with a primary access point for Internet searching and use.

Although such centralized sites have various advantages (e.g., the ability to provide an optimized directory to search available resources), the above Internet model, as a whole, suffers from a number of shortcomings. For example, such centralized access and search sites (especially to the extent that they may become inoperable or shut down for any reason), are potential single points of failure, or "weak links in the chain," to the flow of information. Moreover, they typically provide access to only a small portion of the total resources of the Internet (less than 1%, by some estimates, and this number will grow smaller as the Internet grows larger), and may provide links to sites which are outdated (i.e., no longer available). In short, users become overly reliant on services which do not provide reliable, effective "one-stop" Internet access and searching.

As a result, "peer-to-peer" networks, in which every computer can serve as both a host and a client (i.e., can both provide and receive files to/from one another), have recently become more popular. Such networks link individual computers to one another, and are essentially file-sharing systems with limited searching abilities. These networks have certain advantages over the Internet model described above. For example, peer-to-peer networks often provide a greater number and variety of resources. Moreover, links will not be outdated, to the extent that only those files which are currently connected to the network are searched.

Some peer-to-peer networks, however, remain largely centralized. That is, although users are connected to each other, all connections are routed to and/or through a central location. Thus, such systems retain at least some of the shortcomings discussed above; primarily, they contain an obvious choke point(s) at which the exchange of information may be slowed or stopped. Moreover, although such networks have the potential to provide a greater number and variety of resources, it has been difficult to devise a searching technique for effectively utilizing these resources.

Decentralized peer-to-peer networks also exist, in which each computer is linked only to other computers within the network. These networks provide many of the advantages of a centralized peer-to-peer network, but are much more resilient, inasmuch as they are not dependent on any particular site or server. However, as will become apparent, a search technique which is efficient and effective on these networks has not yet been devised.

FIG. 1 illustrates a simplified block diagram of a generic decentralized peer-to-peer network 100. In FIG. 1, a user "A" on host computer 110 connects to at least one other host, which is itself connected to at least one other host on the network. In FIG. 1, each host is numbered 1-5 to demonstrate the number of connections, or "hops," between that host and the user host 110. For example, host 120 is designated "2," as it is 2 hops away from user host 110. Host 130 is 5 hops away from user host 110 via one connection path, but is only 3 hops away via another connection path.

A more specific example of a known decentralized peer-to-peer network is the Gnutella Network (hereafter, Gnutella), which utilizes the basic structure shown in FIG. 1. To utilize Gnutella, a user A must first connect to the network by connecting to at least one other host 140, as shown in FIG. 1. This host may be selected at random, or a particular user may have the knowledge or desire to choose a particular host or hosts. In either case, the user is thus connected to a number of hosts through the initially selected host(s). In other words, the user's connections will spread out until the number of hosts (approximately) reaches a predetermined number of hosts (hereafter referred to as a cluster of hosts) which the network is deemed capable of handling. The hosts illustrated in FIG. 1 may be thought of as such a cluster of hosts.

To process a search request, Gnutella simply passes the search query from one host to the next, in the hopes of finding the searched-for data on a host which is only a few "hops" away. Thus, the query will not reach beyond the user's isolated cluster of hosts, which contain only a limited amount of content (especially if the user chose poorly in selecting his or her initial host connection). This results in poor search results, despite the availability of content in the broader network.

Moreover, the exponential manner in which queries are passed from one host to the next can easily result in many or all of the hosts being virtually dedicated to nothing but the activity of passing along queries and query results for other hosts, with little time or ability left over for any other functionality. Clearly, this shortcoming causes each host, as well as the network as a whole, to operate significantly slower than at optimum speed.

Additionally, in peer-to-peer networks in general, hosts periodically connect and disconnect, so that the availability of hosts is constantly in flux. In other words, although links in a peer-to-peer network will not be stale or outdated in the traditional sense (as mentioned above), it is possible that, even if a given host still contains the desired information, the host will be disconnected from the network when a user seeks to access this information. Also, a host could disconnect from the system during a download of search results. This instability further deteriorates the reliability of searches on the network.

Finally, since hosts in Gnutella and other peer-to-peer networks are selected blindly, there is no way of using geographical location of the other host(s) as a factor in host selection/searching. In other words, prior art peer-to-peer networks will show that a given host is directly connected to the user (and therefore seemingly a good candidate for access), but will not demonstrate the fact that the host may be geographically very distant from the user. As a result, the transfer of information is inefficient in such networks; for example, a time required to search and download files may become inordinately long.

What is needed is a system and method for effectively and efficiently searching a decentralized peer-to-peer network, in which the likelihood of fast, favorable search results is increased, and the stability of the network is improved.

SUMMARY OF THE INVENTION

A system and method for searching a decentralized peer-to-peer network according to an embodiment of the present invention utilizes intelligent host selection to increase the chances of fast, favorable search results (i.e., results which are useful to the searcher) and to provide a more stable network environment.

In particular, the present invention optimizes the starting points (i.e., starting hosts) for distributed search queries by directing queries to hosts that provide the best chance of either housing the content or being linked to a group of hosts that contain the content.

In order to achieve the above, the present invention monitors the hosts within the network over a period of time, and collects a large and dynamic set of data. Using this data set, the present invention ranks the monitored hosts according to which ones are most stable and most likely to contain favorable search results. Thereafter, the present invention routes search queries to the most highly-ranked hosts.

Thus, a user is generally directed to a cluster of hosts deemed most likely to return fast, favorable results. However, the user can request to be re-connected to another (highly-ranked) host cluster if that user wishes to search for more or different results. Alternatively, the user could be periodically reconnected to another host cluster as a matter of course, in order to ensure the broadest search possible.

Examples of the collected data used to rank the hosts include the number of files on a host and the number of kilobytes stored on a host. This data is useful because hosts with high levels of content are good starting points for distributed queries. Similarly, hosts that are either connected to hosts with high levels of content, or are close to such hosts, are good starting points for queries.

Additionally, the data set may include the frequency with which a particular host is connected to the network, as well as the reliability of that host's connection. In this way, search queries can be directed to certain hosts that are deemed stable, so that the user operates in a more stable environment.

The data set may also include content-specific data (such as file type or topic). For example, a cache memory can store such content-specific data, along with a network location of hosts which contain the data. This data can be collected by, for example: (1) intercepting queries to and from other hosts within the network, (2) using a user's previous search results, or (3) using results from periodically-posed common queries to the network. Preferably, a user's search query to such a cache memory should subsequently be directed only to those hosts which are connected to the network at the time of a user's search. In this way, users can quickly locate connected hosts which previously proved useful in returning favorable results on a specific topic or file-type.

The data collected on the various hosts should include data concerning the geographical location, as well as network connectivity information and network location of the host(s), so that a user may connect to hosts which are as close as possible to the user. Preferably, this location data should be collected by spreading the data-collecting functionality to various geographical locations which are as close as possible to a particular user. In one embodiment of the invention, virtually the entire collecting, ranking and storing functionality of the invention may be performed by each user.

Other types of data to be collected for use in host ranking, and various methodologies for ranking the hosts based on the data, are discussed in more detail below.

Other features and advantages of the invention will become apparent from the following drawings and description.

BRIEF DESCRIPTION OF THE DRAWINGS

The present invention is described with reference to the accompanying drawings. In the drawings, like reference numbers indicate identical or functionally similar elements. Additionally, the left-most digit of a reference number identifies the drawing in which the reference number first appears.

DETAILED DESCRIPTION

The present invention is directed to a system and method for effectively searching a peer-to-peer network in a stable network environment. While the present invention is described below with respect to various explanatory embodiments, various features of the present invention may be extended to other applications as would be apparent.

Figure 2:
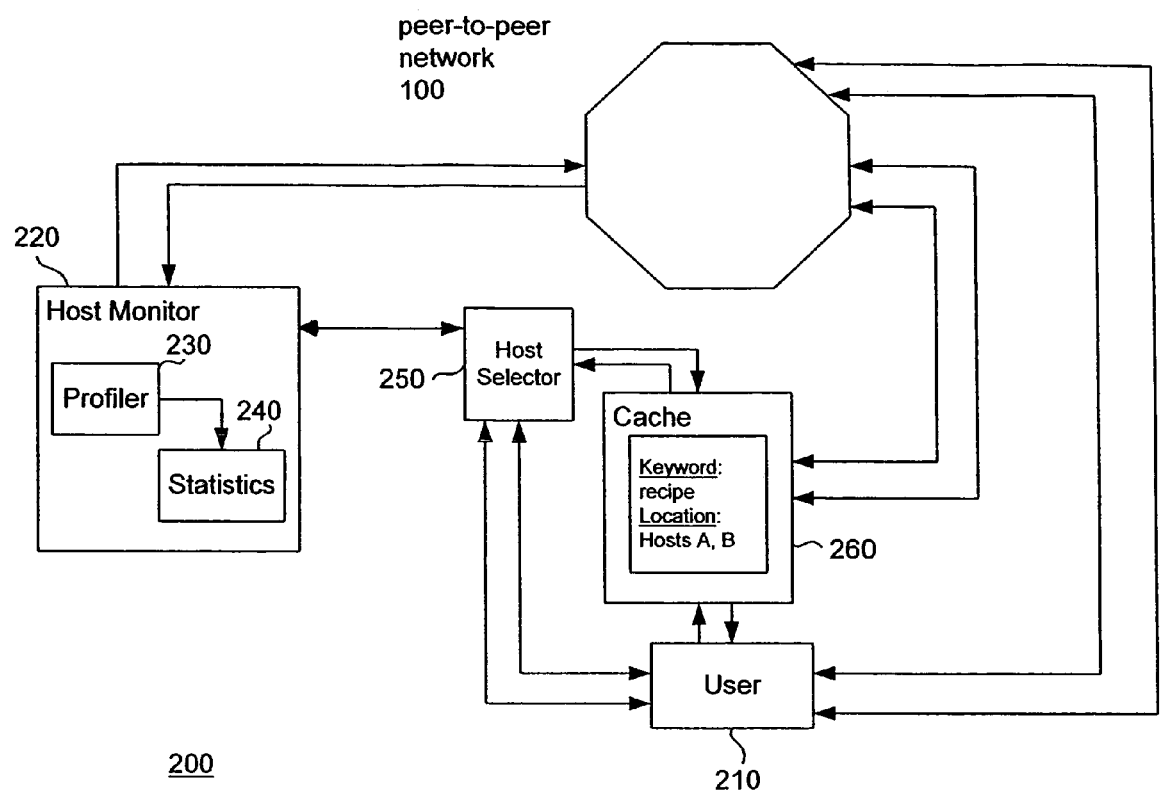
FIG. 2 illustrates a network overview of an embodiment of the present invention.

FIG. 2 illustrates a system overview 200 of one embodiment of the present invention. Although the various system components appear to be external to network 100, it is important to note that this is for the sake of illustration only. That is, all of the system components may be connected to and within network 100, and may therefore send, transmit or respond to queries from any other host within the network. In particular, user 210 should be thought of as just as an example of any (potential) host within the network 100.

In FIG. 2, peer-to-peer network 100 may be a known decentralized peer-to-peer network. User 210 can access network 100 directly, for searching and other uses. However, according to the present invention, user 210 also receives information on intelligent and optimized host selection, to thereby dramatically improve the user's search time and results when performing searches for files throughout network 100.

Host monitor 220 is responsible for collecting data on the hosts within network 100. More specifically, host monitor 220 collects status information about the hosts, such as the connectivity status of the hosts to the network, the amount of content on the hosts which is available to the network, etc.

Generally, host monitor 220 actively collects up-to-date status information on the hosts within network 100.

In one embodiment, host monitor 220 contains profiler 230 and statistics database 240. Profiler 230 periodically sends a data collection signal(s) into network 100, and collects corresponding status information in statistics database 240.

Host selector 250 receives data from host monitor 220 and ranks the hosts within network 100. That is, the hosts within network 100 are ranked according to criteria (based on the collected status information) which determine the most useful hosts for a particular user. These ranking criteria may vary according to the needs of a particular user.

Cache memory (hereafter, cache) 260 stores information about the content of hosts within the network, as opposed to the status information collected by host monitor 220. That is, cache 260 stores information on the type of files available from a particular host (for example, JPEG files), and/or topical information available from a particular host (for example, files containing recipes). The content information can be collected in a variety of ways, but is generally collected passively and, therefore, may become outdated (for example, a host containing certain content may disconnect from the network).

Thus, based on the above description, it is apparent that a user 210 who wishes to initiate a search of network 100 can receive a snapshot of the topology of network 100 from host selector 250 and cache 260. This information will guide the user's search, allowing the user to intelligently choose a host or hosts which will be most likely to return fast, favorable results to the user.

Preferred embodiments of host monitor 220 will now be discussed in greater detail.

Although conventional decentralized peer-to-peer networks have limited ability to gather data concerning the network, these statistics are not sufficiently helpful or reliable, and do not assist at all in intelligent host selection. For example, Gnutella provides the number of hops between hosts. However, a host can be directly connected to another host, yet the machines the hosts run on may be on the opposite sides of a continent. Also, Gnutella provides no statistics on the stability of a particular host or hosts. Hence, Gnutella statistics can be very misleading.

There are many statistical measures of hosts within network 100 which can be measured by host monitor 220 to provide status information about the hosts, and thereafter be sent to host selector 250. The following is an exemplary list of statistical measures which can be monitored and collected by Host monitor 220.

Round trip time (hereafter, rtt): This measure is defined by the time it takes a query from the profiler 230 to return a result from the host being profiled. Rtt may be measured using a ping. Ping, as is commonly known, is short for Packet Internet Groper, and is a utility to determine whether a specific IP address is accessible. It works by sending a packet to the specified address and waiting for a reply. In general, a packet is a piece of a message within a packet-switching protocol, which is a protocol in which a message is broken into pieces (packets) to be sent separately to a destination, where they are recompiled. Advantageously, packets contain their destination address, as well as any data to be transmitted. ICMP, short for Internet Control Message Protocol, supports packets containing error, control, and informational messages. Thus, for example, the rtt can be determined based on the average of three ICMP pings.

It is important to note that rtt for a particular host relative to a particular user is dependent on where the profiler is geographically located. Hence, in a preferred embodiment, multiple profilers are maintained in remote locations; for example, in different sections of a country, or within a predetermined distance of a user. This can provide information related to the physical location of the host.

Bandwidth (bw) The bandwidth is a measure of the throughput of a host being profiled; i.e., its ability to receive, transmit and/or respond to a particular amount of data in a particular amount of time. Bw can be measured based on doing 2 ICMP pings, with different length of the payload, and determining the impact on the return time. Like rtt, bw is dependent on where the profiling machine is located, due to the interconnecting network. For instance, the bw between two hosts within an intranet is likely to be high. However, the bw between a host inside an intranet and one outside the network is typically smaller, since it is limited by the smallest interconnecting pipe between the two hosts.

Gnutella round trip time (grtt)—This is the time it takes for a Gnutella ping to return to the profiling machine. A Gnutella ping is simply a type of ping used by Gnutella to obtain the Gnutella topology. That is, an ICMP ping travels through the Internet topology, while the Gnutella ping travels through the Gnutella topology (based on the ad-hoc interconnections between hosts).

Number of files shared (nf)—This measures the number of files shared (i.e., made available to the rest of the network) by a particular host.

Number of kilobytes shared (nk)—This measures the number of kilobytes shared by a particular host.

Hops away from pro filer(s) (hops)—This measures the approximate number of hosts between the profiler and a particular host.

Number of hosts connected (nh)—This measures the number of hosts connected to a particular host.

Liveness Score (lh)—This measures how many times in the last 60 minutes that a particular host is alive.

Reachability of Host (rh)—This details how many times the host monitor has successfully connected directly to a particular host.

It would be most desirable to collect all of the above data, along with additional data (and have the data be current to the second or better), from every host on the network. This would allow the best selection of hosts for searching. However, as a practical matter, to do so could overly tax the hosts and/or network. For instance, performing ICMP pings on all the hosts would result in a flood of complaints from the administrators of these machines. Therefore, it is preferable to collect only the data necessary to gain a desired improvement level in searching, to thereby avoid overly taxing the hosts and/or network.

For example, once enough historical data has been obtained, stable and unstable hosts can be identified. Stable hosts may not need to be monitored with the same frequency as unstable hosts. For example, stable hosts can be assessed relatively infrequently, for example, every week. In contrast, unstable hosts can be checked more often, for example, once per day.

Similarly, host monitor 220 may ping a limited number of machines from a certain network, and extrapolate results to the rest of the network. This method can avoid the need to ping all other machines from that same network.

Also, within Gnutella, a Gnutella ping can be used to gather other relevant statistical measures. For example, a Gnutella ping can be sent every 5 minutes. Additionally, ping messages (more precisely pong messages; i.e., the ping messages which are returned from a host) that are routed through the network can be used to extract the Gnutella network topology. That is, as mentioned above, host monitor 220 can be thought of as being within the network and, therefore, receives and passes the various queries which are constantly being transmitted by all hosts. Thus, these messages (i.e., the ping messages that are being broadcast by other Gnutella hosts) can be monitored, in order to decrease the frequency with which pings are sent by the present invention. For instance, a host that sent out a ping and a host that responds to a ping, are clearly both alive, and will not have to be pinged again soon.

Figure 3:
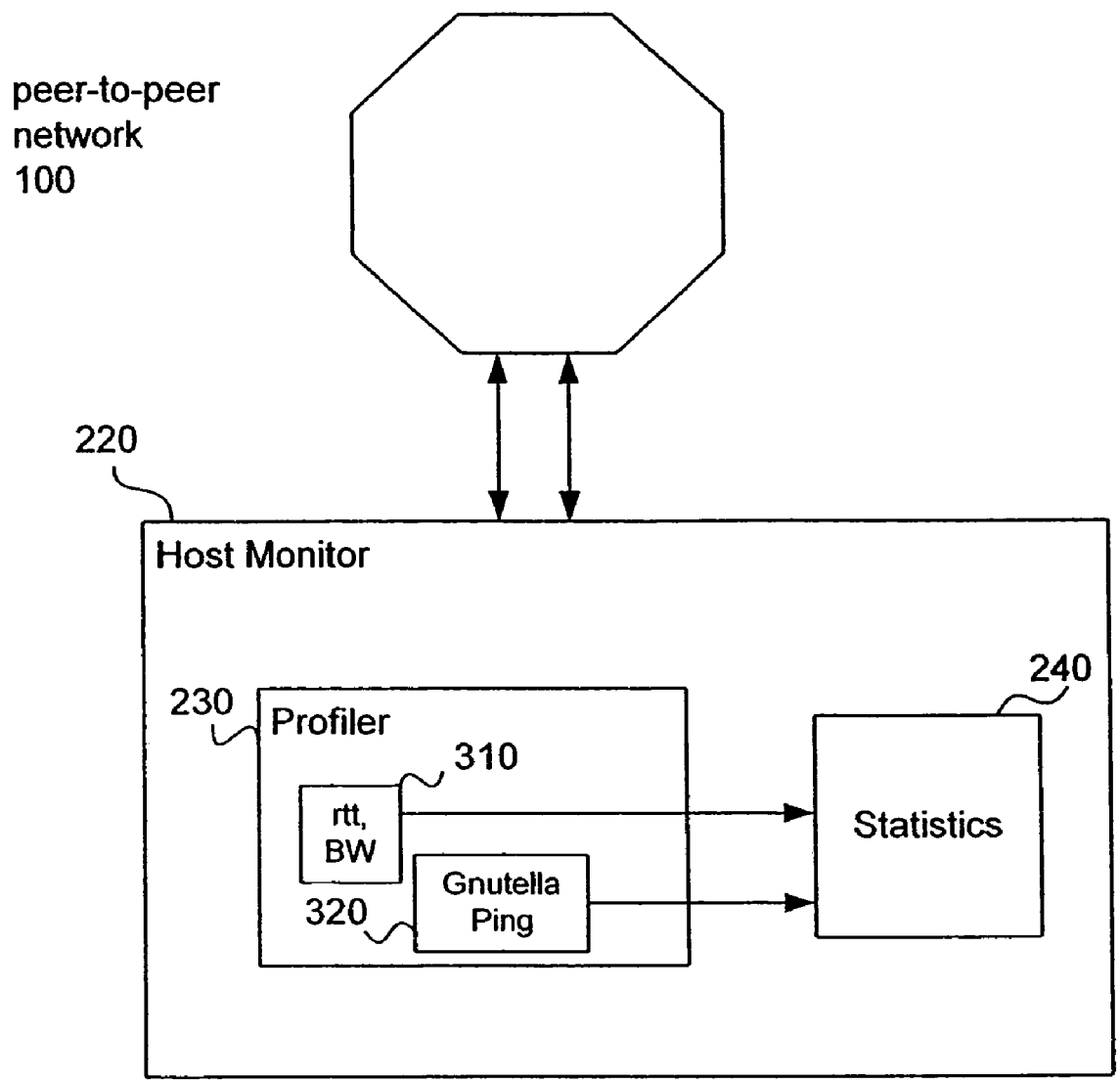
FIG. 3 is a more detailed view of an exemplary host monitor such as the one shown in FIG. 2.

An example of host monitor 220 which efficiently collects data is shown in more detail in FIG. 3. In FIG. 3, Rtt/Bw Measurer 310 runs every day to measure rtt and bw of unstable hosts and every week to measure the rtt and bw of stable hosts. Also, Gnutella Pinger 320 runs every 5 minutes to obtain grtt, nf, nh, nk, hops. As discussed above, Gnutella Pinger 320 also serves to snoop Gnutella pongs (i.e., to passively monitor returning pings which are sent by other Gnutella hosts) to help decrease the frequency of the pinging.

Although the above statistical measures can be grouped according to which is most important to a particular user, it is also true that, in general, rtt and bw are very important in making host selection decisions. This is due to the fact that users of the network can be located in geographically remote locations. Hence, for example, when a user from the East Coast wants to download or share files, it is best to use servants that perform most efficiently for the East Coast. Therefore, in one embodiment of the invention, a plurality of profilers is used, and each one is in a location which is geographically remote from the others.

In a further embodiment for efficiently collecting the network data, the amount of data to be collected may be reduced by dynamically identifying hosts which are important "hubs" in the network, and concentrating on those hosts (for example, collecting data about these hosts every 5 minutes, and collecting data on remaining hosts less frequently).

For example, the host monitor may closely monitor a predetermined number of hosts out of the total number of hosts within the network, and periodically track pongs from these hosts. Subsequently, these hosts can be ranked based on their various characteristics (e.g., nh), so that only a certain percentage of these hosts (e.g., the top half) need be retained as hubs.

Thereafter, at less frequent time intervals, a certain number of the (most lowly-ranked) hubs can be removed from the list of hubs, so that the process can be repeated. That is, the predetermined number of hosts within the network may be monitored and ranked again, resulting in a new set of hubs. Specifically, a new set of hosts for monitoring might be chosen randomly, or based on the number of hops they are away from the current set of hubs (i.e., the higher the number of hops from the current hubs, the better the coverage of the network will be). This replacement process need only incur infrequently; for example, several times a day or less. In this way, as the network changes, the hubs of the network will also change, and the host monitor will dynamically reconfigure itself to the new network topology. Thus, the network can be efficiently and effectively monitored.

It is important to note that all of the collected data discussed above contains a "network location" of a corresponding host. This allows the present invention to correctly associate a particular (set of) statistics with the proper host, for later direction of (for example) search queries. Hence, the host monitor may identify a host having a certain rh and/or bw value as having a particular IP (Internet Protocol) address. However, the network location should not be confused with the geographical location referenced above, which refers to an actual, physical location of a host computer.

In summary, host monitor 220 collects data concerning the current status of hosts within network 100, as well as the corresponding network location of the hosts. Generally, this process occurs actively (e.g., the profiler 230 sends out an ICMP ping and receives it upon its return), but can also occur passively (e.g., Gnutella Pinger 320 snoops Gnutella pongs), in the interest of efficiency. In either case, the data is preferably as up-to-date as is reasonably possible. Thus, the host monitor according to the present invention collects a sufficient amount of data necessary to allow intelligent host selection, while minimizing the impact of host monitoring on the network.

Preferred embodiments of host selector 250, operating in conjunction with host monitor 220, will now be discussed in greater detail.

In general, host selector 250 receives the statistics collected by host monitor 220, and determines the rank of each of the hosts by applying weights to each of the criteria for each profiled host.

The statistics are combined to obtain a host rank based on the characteristics of a "good host." For example, a host rank may be determined as follows.

First, the desired characteristics of a "good host" may be defined as:
1. 0.1 ms (rtt)
2. 8 Mbps (bw)
3. grtt is not considered
4. 250 files shared (nf)
5. 1.250 G shared (nk)
6. 2 hops away (hops)
7. 20 hosts connected to it (nh)
8. 12 (lh) (i.e., alive 12 times in past 60 minutes, if period of checking is 5 minutes
9. 1 (rh) (i.e., actually connected to host in past day)

Then, for the measures bw, nf, nk, nh, lh and rh, hosts that have exactly the value of a "good host" are given a score of 1 for the statistic. Hosts with lower values (than the benchmark given for a good host) are penalized, and hosts with higher values are rewarded. For instance, if a host has a bw value of 4 Mbps, it will get a bw score of 0.5 (4 Mbps/8 Mbps). The reward (and/or penalty) may decrease (increase) as the value increases (decreases) beyond a certain point, for example, in either a linear or exponential fashion.

Conversely, for the measures of rtt and hops, hosts with higher values are penalized, and servants with lower values are rewarded. The reward/penalty function can again be correspondingly adjusted, as referred to above.

Subsequently, each of the above-determined scores for bw, nf, nk, nh, rtt, hops, lh and rh is assigned a weight. Then, the overall score (rank) is obtained by applying a weight to each measure, as follows:

Host rank=*Bw* weight\**Bw*_core+*nf* weight\* *nf*_score+ . . .

In this way, the hosts can then be ranked by their respective host rank scores. Also, for example, the hosts that were alive in the last ten minutes can be ranked first, and then the hosts that were alive in the last hour can be appended to the list. Thus, hosts most likely to be available are preferred.

Note that the above formula can be manipulated based on the needs of the user performing a host selection. For instance, for two host selection servers, one may weight rtt and bw more over the number of hosts connected, whereas another host selection server may weight more highly the number of hosts connected, and so on.

Figure 1:
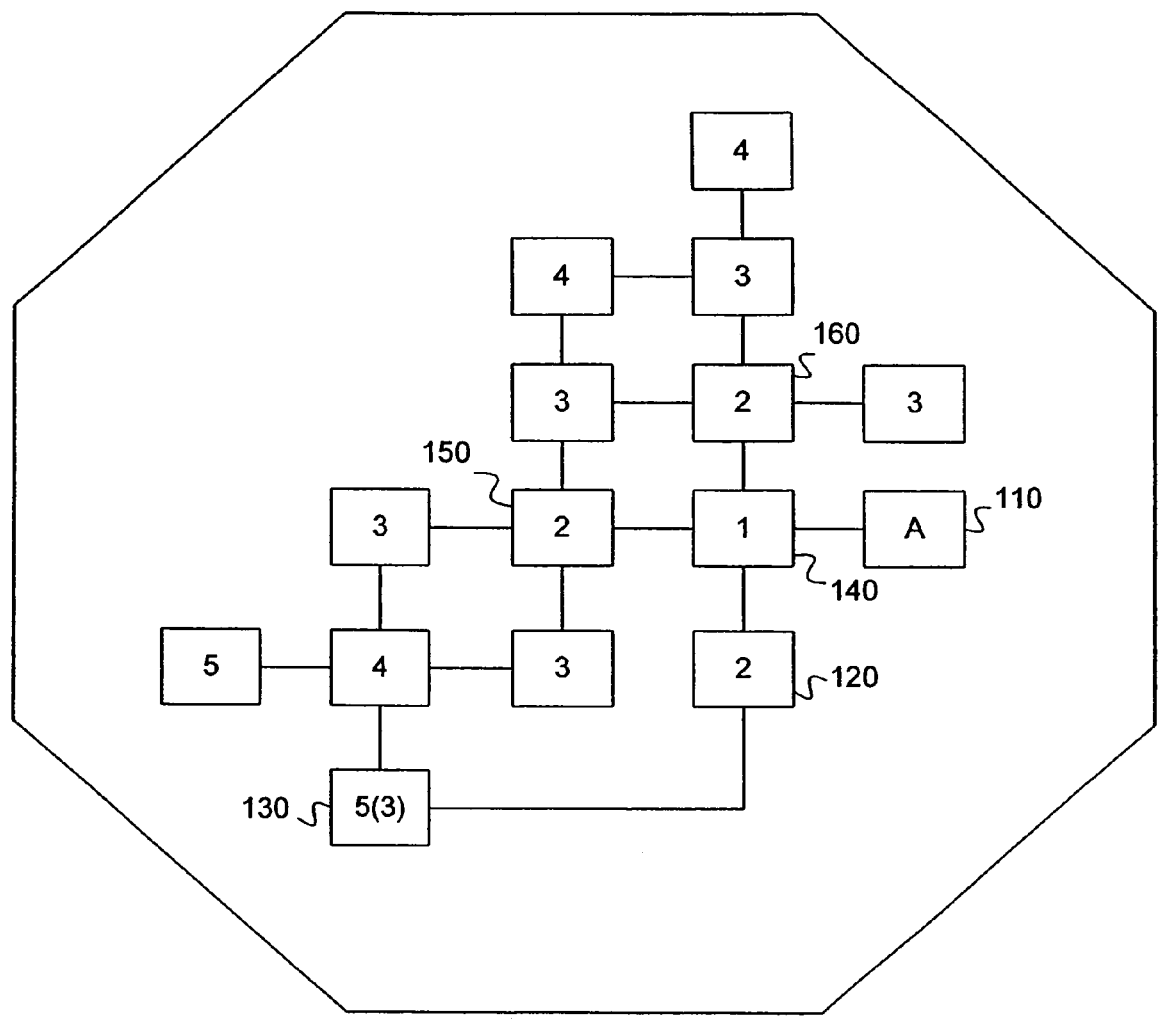
FIG. 1 illustrates a conventional decentralized peer-to-peer network.

Additionally, a host which is very limited in one aspect may nevertheless be very valuable. For example, a host may contain no searchable content whatsoever (nf=nk=0); nevertheless, that host may be highly ranked if it is connected to a large number of other hosts (and particularly if these hosts contain a large amount of content). In other words, the host rank does not have to depend on the intrinsic properties of the host itself, but can be based on connection properties as well. Such values can be measured by recursive propagation. To illustrate this point, consider the network 100 shown in FIG. 1, and consider that host monitor 220 sends a ping from the location of host 120 to host 140 (i.e., one hop, and disregarding host 130 for the moment). The result may be that host 140 contains little or no content. However, sending a ping two hops from host 120 returns a result of at least three other hosts 110, 150 and 160, all of which may contain a large amount of information. Therefore, host 140 may be highly ranked. This process can be extended by sending a ping out three hops, four hops, etc.

Additionally, it may be preferable to periodically select hosts based only on hops, in order to increase the coverage of the hosts selected. In other words, even if intelligent host selection is performed as described above, a user will be limited to the cluster of hosts corresponding to the selected hosts (as conceptualized by the host cluster of FIG. 1). This is because the number of hosts to which a query may be passed is limited by the limits of the network and the exponential nature of the query circulation.

For example, in Gnutella, messages are usually given a time-to-live (ttl) of seven. That is, if a message has been forwarded seven times, the host currently processing the message drops it. Otherwise, the number of connected hosts would grow too rapidly for the user and/or the network to manage. Thus, the user is effectively limited to a cluster of inter-connected hosts, so that hosts that are, for example, ten hops away from a user host are usually inaccessible to that host. However, these inaccessible servants may be accessible to servants that are seven hops away in a different direction. Thus, it may be beneficial to effectively give a user access to a separate cluster of hosts by periodically selecting a high hops host.

Also, the user could be given the option of simply choosing to jump to another host cluster. That is, the user could choose to simply continue a search from a new starting point of another, also highly-ranked host. This could also be achieved automatically, by simply periodically moving the user to a new starting point (i.e., new starting host).

In summary, the host selector 250 serves to combine the results of the profiler 230 (as collected in statistics database 240), and thereby compute host rank. The host selector may also jolt the system every so often using the high-hop technique described above, or may allow the user to search from a new starting point, as desired or necessary.

Additionally, in order to improve the speed and quality of search results received by a user, a preferred embodiment of the present invention employs a cache 260, which will now be discussed in greater detail.

Generally, cache 260 collects content information related to hosts within the network 100, such as specific types of files or types of topics which are available for searching on the hosts. As shown in FIG. 2, cache 260 may include a list of keywords related to a specific topic, such as "recipe," as well as a network location of hosts A and B which contain information on this topic.

In a preferred embodiment, cache 260 passively collects this information by intercepting queries and responses sent by other hosts within the network. In other words, the cache 260, inasmuch as it is simply another host within the network, must receive and transmit queries/responses from other connected hosts. In so doing, the cache 260 may record which hosts contain specific content data (e.g., snoop Gnutella pongs for content data, as described above with reference to the collection of status data by host monitor 220).

This content information will be collected sporadically, to the extent that the cache 260 cannot control which queries are sent and responded to by other connected hosts. Therefore, over time, the content information may become outdated. For example, perhaps the recipe information on host A will be removed from that host, or host B may simply be disconnected from the network. Thus, in one embodiment, contents of cache 260 are only stored up to a maximum of some predetermined period of time. However, to guard against the deletion of certain common or desired content information, the cache 260 may periodically send a query concerning that content to the network 100, and thereafter store the result.

Additionally, cache 260 may rely on host monitor 220, through host selector 250, to provide information on whether a particular host is currently connected to the network 100. In this way, statistics collected by host monitor 220 serve to effectively filter out unstable or disconnected hosts from cache 260 when it responds to a particular user request.

Still further, the host selector 250 may serve to rank the hosts stored within cache 260, using the techniques described above with reference to the host selector. For example, at a given time, cache 260 may store information that twenty hosts contain information on recipes, or twenty hosts contain JPEG files. From these twenty, ten may be removed (i.e., filtered out) because they are currently inactive, or disconnected. The remaining ten may be ranked according to the statistics (status information) collected by the host monitor 220 and ordered by the host selector 250. In this way, a user may choose the top one or two hosts, which are known to contain (or have access to) a large amount of the type of information desired, and which can be quickly and conveniently accessed by the user. Thus, the user may effectively form a sub-network from the network as a whole, where the sub-network contains only hosts having the topic or type of files which the user finds most useful.

In yet another exemplary embodiment, the information collected by the cache need not be entirely deleted after a predetermined period of time. Instead, for example, the information relating to the type of file(s) available on a particular host or hosts may be separately saved and analyzed. In this way, over time, a topology of hosts which routinely make available certain file-types can be created and stored.

To practice this embodiment, a user might first send a query to the cache itself, as described above. Additionally (or alternatively), the user may determine a host using the topology of hosts just discussed, where this topology may be saved and accessed as part of the cache, the host monitor, or by an entirely different component of the invention. In this way, again, the user may direct queries to those hosts which are very likely to contain the types of files for which the user is searching (for example, JPEG files). Also as before, the topology of hosts just referred to may be filtered/ranked by the host selector, so that a user may further increase the chances of a fast, favorable result.

In summary, cache 260 (in conjunction with host monitor 220 and host selector 250) allows a user to initiate a search of the network based on the content of the various hosts within the network, rather than just the status of the various hosts. Thus, the user is more likely to receive fast, favorable results.

Figure 4:
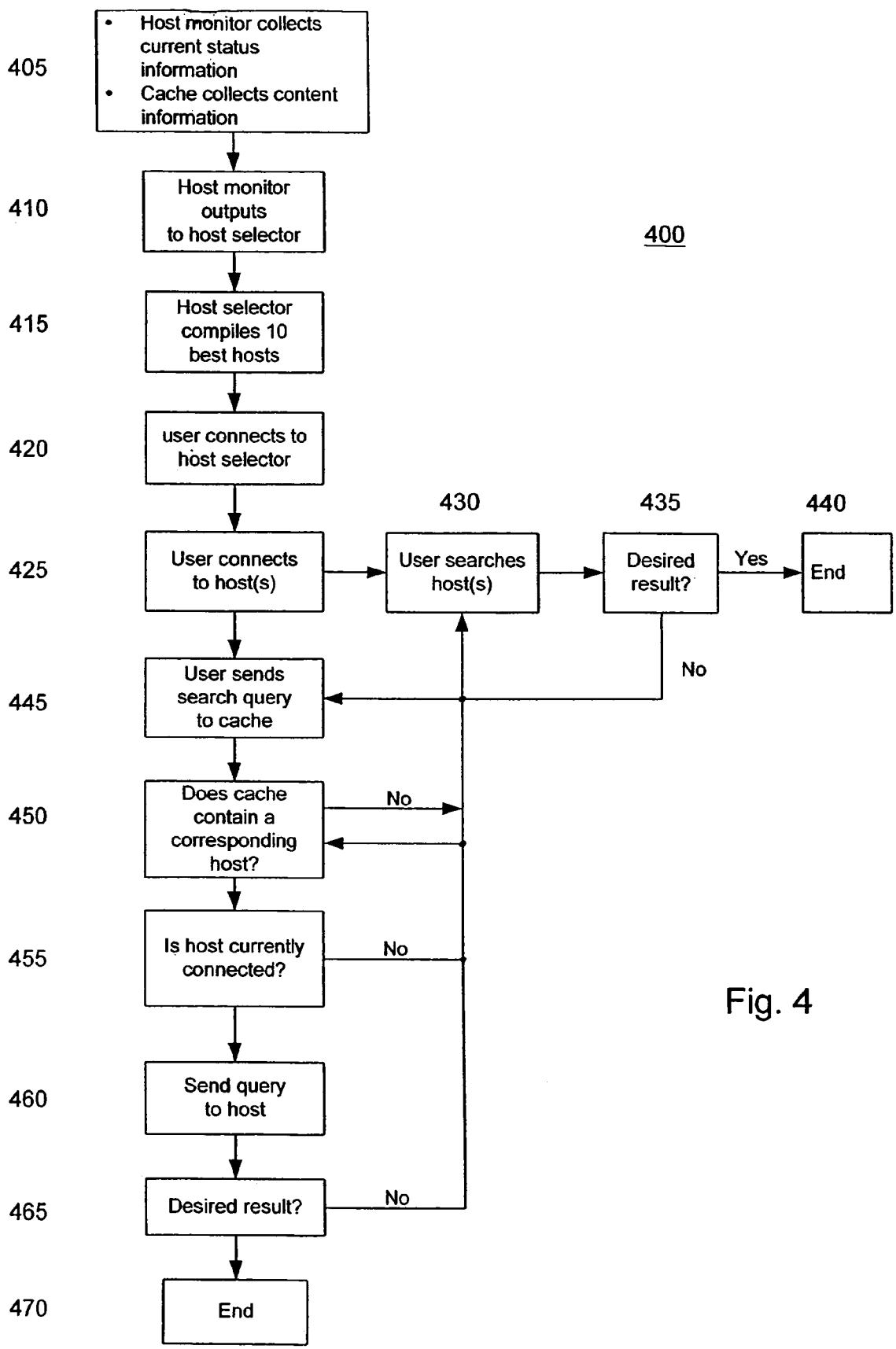
FIG. 4 is a flow chart illustrating an exemplary methodology of an embodiment of the present invention.

FIG. 4 illustrates an exemplary methodology 400 by which a user may practice the present invention. In step 405, as discussed above, the host monitor and cache collect status and content information, respectively, about network 100. For the host monitor, this process is generally performed periodically and actively. For the cache, the process is generally passive, and occurs as information becomes available.

In step 410, the host monitor outputs its collected status information to the host selector 250. The host selector uses this data in step 415 to compile a list of, for example, ten hosts which are most likely to provide favorable search results.

Thereafter, a user may connect to the host selector in step 420, in order to receive the list of the ten hosts (i.e., their IP addresses). The user uses this information in step 425 to connect to one or more of the hosts.

At this point, the user may choose to search the network in step 430, using the provided host or hosts. As discussed above, such searching may include periodically restarting the search with another host or cluster of hosts. If this method returns desired results in step 435, the user may wish to end the search in step 440 (the user may of course continue searching the selected hosts as long as he or she desires).

If this method does not return desired results, the user may send a search query to the cache in step 445. In a preferred embodiment, the user may send a search query to the cache in step 445 immediately after connecting to the host(s) in step 425.

In step 450, it is determined whether the cache contains a host which may contain the desired information. If not, the user may continue in step 430 searching hosts provided by the host selector. However, if it is determined that such a host is stored within the cache, then the connectivity status of the host is checked in step 455, using statistics provided by the host monitor.

If the host is not currently connected to the network, the presence of another host within the cache may be checked in step 450. However, if the host is currently connected, the query may be sent to that host in step 460. Receiving a desired result in step 465 ends the flow in step 470. Otherwise, the user must return either to another cached host in step 450, or else to the hosts provided by the host selector in step 430. Of course, the user may stop the flow at any time simply by disconnecting from the network.

When implementing the embodiment of the invention as described above, it is possible to include all of host monitor 220, host selector 250 and cache 260 at a single, remote location with respect to all users. However, as already noted, it is preferable to utilize a plurality of geographically remote profilers, in order to determine and make use of hosts which are closest to a particular user.

Additionally, it may be preferable to include some, or even all, of the functionality of the present invention at the location of a particular user. In other words, depending on the user's access and available resources, it is possible to include a host monitor, host selector and cache on a client computer. In this embodiment, since the resources of such a client computer are likely to be limited, various steps can be taken to reduce the amount of resources necessary to implement this embodiment of the invention. For example, such a user may only monitor hosts periodically, rather than constantly, or may only monitor a certain number of relatively local hosts. Similarly, the cache employed by the user could be more limited.

In this embodiment, users may nevertheless send data concerning the hosts to a central site. Thus, if a plurality of users were to participate in this manner, the central site would be able to construct an excellent estimate of the network as a whole, by combining the information provided by local users about their local networks.

As is evident from the above, the present invention assists a user in performing a search of a decentralized peer-to-peer network by directing that user to the most pertinent, reliable hosts which are currently available on the network. The selected hosts are also the ones capable of returning results most quickly (e.g., are closest to the user). Thus, the user's search time is reduced, and the odds of favorable results are increased. Moreover, the stability of the network (as seen by the user) is increased, and the number of queries passed through the network is reduced.

While this invention has been described in a preferred embodiment, other embodiments and variations can be effected by a person of ordinary skill in the art without departing from the scope of the invention.

What is claimed is:

1. A method for optimizing access of a computer to information, the method comprising:
   maintaining a database that includes status information about a plurality of computers within a network, the status information including a frequency with which each of the plurality of computers are connected to the network;
   maintaining a memory that includes content information about data available from the plurality of computers within the network;
   identifying one or more computers from the plurality of computers within the network that are least likely to provide information desired by the computer, based on the status information;
   removing from the memory the content information associated with the identified one or more computers at a time of a request for the information; and
   accessing one of the plurality of computers within the network based on the content information remaining in the memory.

2. The method of claim 1, further comprising updating the status information of the database periodically, so that the status information of the database is current.

3. The method of claim 1, further comprising intercepting exchanges between the plurality of computers within the network to collect the content information of the memory.

4. The method of claim 1, wherein the status information includes a current connectivity status of the identified one or more computers.

5. The method of claim 1, wherein the status information includes a download capability measurement of the identified one or more computers.

6. The method of claim 1, wherein the status information includes information on a number of files contained within each of the plurality of computers within the network.

7. The method of claim 1, wherein the content information includes one or more of:
   information identifying types of files available for searching on the plurality of computers within the network; and
   information identifying topics of files available for searching on the plurality of computers within the network.

8. The method of claim 1, wherein the memory is a cache memory, the cache memory improving a speed and a quality of providing results in response to the request for information.

9. A system for optimizing access to information within a network, the system comprising:
   a database coupled to the network, wherein the database includes status information about a plurality of computers within the network, the status information including a frequency with which each of the plurality of computers are connected to the network;
   a memory coupled to the network, wherein the memory includes content information about data available from the plurality of computers within the network; and
   a computer coupled to the network wherein, at a time of a request for the information by the computer, the content information of the memory is filtered using the status information of the database based on an identification of one or more computers from the plurality of computers within the network that are least likely to provide the information desired by the computer, and removal of the content information associated with the identified one or more computers from the memory, and one of the plurality of computers within the network is accessed by the computer based on the filtered content information of the memory, wherein the one of the plurality of computers within the network belongs to a cluster of hosts deemed most likely to return fast results.

10. The system as recited in claim 9, wherein the status information of the database is updated periodically, so that the status information of the database is current.

11. The system as recited in claim 9, wherein the content information of the memory is collected by intercepting exchanges between the plurality of computers within the network.

12. The system as recited in claim 9, wherein the status information of the database includes information on a number of files contained within each of the plurality of computers within the network.

13. The system as recited in claim 9, wherein the status information includes a current connectivity status of the identified one or more computers.

14. The system as recited claim 9, wherein the status information includes a download capability measurement of the identified one or more computers.

15. The system as recited in claim 9, wherein the content information includes one or more of:
- information identifying types of files available for searching on the plurality of computers within the network; and
- information identifying topics of files available for searching on the plurality of computers within the network.

16. The system as recited in claim 9, wherein the network is a de-centralized peer-to-peer network.

17. The system as recited in claim 9, wherein a second cluster of hosts is accessed to search for more or different results.

* * * * *